United States Patent
Rao et al.

(10) Patent No.: US 9,742,568 B2
(45) Date of Patent: Aug. 22, 2017

(54) TRUSTED SUPPORT PROCESSOR AUTHENTICATION OF HOST BIOS/UEFI

(71) Applicant: DELL PRODUCTS, L.P., Round Rock, TX (US)

(72) Inventors: Balaji Bapu Gururaja Rao, Austin, TX (US); Elie Antoun Jreij, Pflugerville, TX (US); Richard Lynn Hall, Cedar Park, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 9 days.

(21) Appl. No.: 14/863,401

(22) Filed: Sep. 23, 2015

(65) Prior Publication Data

US 2017/0085383 A1 Mar. 23, 2017

(51) Int. Cl.
| | |
|---|---|
| *G06F 9/24* | (2006.01) |
| *G06F 15/177* | (2006.01) |
| *G06F 21/00* | (2013.01) |
| *G06F 21/44* | (2013.01) |
| *H04L 9/32* | (2006.01) |
| *G06F 21/57* | (2013.01) |
| *G06F 3/06* | (2006.01) |

(52) U.S. Cl.
CPC .......... *H04L 9/3234* (2013.01); *G06F 3/0619* (2013.01); *G06F 3/0632* (2013.01); *G06F 3/0679* (2013.01); *G06F 21/575* (2013.01); *H04L 9/3242* (2013.01)

(58) Field of Classification Search
CPC .... G06F 3/0619; G06F 3/0632; G06F 3/0679; G06F 21/575; H04L 9/3234; H04L 9/3242
See application file for complete search history.

(56) References Cited

U.S. PATENT DOCUMENTS

| | | | |
|---|---|---|---|
| 5,388,267 A | 2/1995 | Chan et al. | |
| 6,138,236 A | 10/2000 | Mirov | |
| 6,715,106 B1 | 3/2004 | Mermelstein | |
| 7,073,064 B1 * | 7/2006 | Angelo | G06F 21/575 710/10 |
| 7,577,832 B2 * | 8/2009 | Wisecup | G06F 9/4416 713/1 |

(Continued)

*Primary Examiner* — Mark Connolly
(74) *Attorney, Agent, or Firm* — Isidore PLLC

(57) ABSTRACT

An information handling system (IHS) prevents execution of corrupted bootup instructions in flash memory. A memory component contains basic input/output system (BIOS) instructions to execute during boot up of the IHS. A host processor is in communication with the memory component via the system interconnect to execute the BIOS instructions to configure the IHS. A support processor executes instructions to configure the IHS to: (a) calculate a current hash value for the BIOS instructions; (b) access a trusted encrypted hash value and the unique key from a secure storage; (c) decrypt the trusted encrypted hash value using the unique key to obtain a trusted hash value; (d) determine whether the current hash value is identical to the trusted hash value; and (e) allow execution of the BIOS instructions by the host processor in response to determining that the encrypted current hash value is identical to the trusted hash value.

18 Claims, 4 Drawing Sheets

(56) References Cited

U.S. PATENT DOCUMENTS

| | | | |
|---|---|---|---|
| 7,774,829 B2* | 8/2010 | Waltermann | G06F 21/31 |
| | | | 713/2 |
| 7,900,058 B2 | 3/2011 | Mabayoje et al. | |
| 8,245,053 B2 | 8/2012 | Hoang et al. | |
| 8,341,393 B2* | 12/2012 | Springfield | G06F 21/57 |
| | | | 713/100 |
| 8,407,147 B2* | 3/2013 | Lenger | G07F 17/32 |
| | | | 705/51 |
| 8,645,711 B2* | 2/2014 | Ohhashi | G06F 21/57 |
| | | | 713/187 |
| 8,909,940 B2 | 12/2014 | Peszek | |
| 9,015,455 B2 | 4/2015 | Held et al. | |
| 9,069,965 B2 | 6/2015 | Liles et al. | |
| 9,129,113 B2* | 9/2015 | Henry | G06F 21/572 |
| 2003/0023966 A1 | 1/2003 | Shimizu et al. | |
| 2003/0191955 A1 | 10/2003 | Wagner et al. | |
| 2004/0025036 A1 | 2/2004 | Balard et al. | |
| 2004/0073806 A1* | 4/2004 | Zimmer | G06F 21/575 |
| | | | 713/189 |
| 2010/0023777 A1 | 1/2010 | Prevost et al. | |
| 2010/0228960 A1 | 9/2010 | Huang et al. | |
| 2013/0191879 A1 | 7/2013 | Jaber et al. | |
| 2014/0040605 A1* | 2/2014 | Futral | G06F 9/445 |
| | | | 713/2 |
| 2014/0068275 A1 | 3/2014 | Swanson et al. | |

* cited by examiner

TRUSTED SUPPORT PROCESSOR AUTHENTICATION OF HOST BIOS/UEFI

BACKGROUND

1. Technical Field

The present disclosure relates in general to authentication of boot instructions of an information handling system (IHS) administration, and more particularly to authentication of a Basic Input/Output System (BIOS) of an IHS server having a host processor and a support processor.

2. Description of the Related Art

As the value and use of information continue to increase, individuals and businesses seek additional ways to process and store information. One option available to users is information handling systems (IHSes). An IHS generally processes, compiles, stores, and/or communicates information or data for business, personal, or other purposes, thereby allowing users to take advantage of the value of the information. Because technology and information handling needs and requirements vary between different users or applications, IHSes may also vary regarding what information is handled, how the information is handled, how much information is processed, stored, or communicated, and how quickly and efficiently the information may be processed, stored, or communicated. The variations in IHSes allow for IHSes to be general or configured for a specific user or specific use such as financial transaction processing, airline reservations, enterprise data storage, or global communications. In addition, IHSes may include a variety of hardware and software components that may be configured to process, store, and communicate information and may include one or more computer systems, data storage systems, and networking systems.

Currently Basic Input/Output System (BIOS) or Unified Extensible Firmware Interface (UEFI) boot up uses signed images to prevent hackers from loading malicious BIOS firmware. While this offers good protection for certain scenarios, it does not protect from a hacker replacing the BIOS Serial Peripheral Interface (SPI) flash contents (via physical tampering or Man-in-the-middle-attack scenarios) with a new one that contains a malicious BIOS image. Currently known approaches also do not protect against scenarios wherein a hacker or disgruntled employee compromise a signing key that is used for encrypting contents of BIOS firmware.

BRIEF SUMMARY

In accordance with the teachings of the present disclosure, an information handling system (IHS) prevents execution of corrupted boot up instructions in a fixed or removable flash memory. In one or more embodiments, the IHS includes a system interconnection and a memory component containing basic input/output system (BIOS) instructions to execute during boot up of the IHS. A host processor is in communication with the memory component via the system interconnection to execute the BIOS instructions to configure the IHS. A support processor is in communication via the system interconnection with the memory component and comprising an embedded memory containing a unique key that is assigned to the support processor. The support processor executes instructions to configure the IHS to: (a) calculate a current hash value for the BIOS instructions; (b) access a trusted encrypted hash value and the unique key from a secure storage; (c) decrypt the trusted encrypted hash value using the unique key to obtain a trusted hash value; (d) determine whether the current hash value is identical to the trusted hash value; and (e) allow execution of the BIOS instructions by the host processor in response to determining that the encrypted current hash value is identical to the trusted hash value.

In accordance with embodiments of the present disclosure, a method of authenticating BIOS of an IHS prevents execution of corrupted boot up instructions. In one or more embodiments, the method includes a support processor calculating a current hash value for BIOS instructions stored in removable flash memory module of an IHS. The method includes the support processor accessing a trusted encrypted hash value and the unique key from a secure storage. The method includes the support processor decrypting the trusted encrypted hash value using the unique key to obtain a trusted hash value. The method includes the support processor determining whether the current hash value is identical to the trusted hash value. The method includes the support processor allowing execution of the BIOS instructions by the host processor in response to determining that the encrypted current hash value is identical to the trusted hash value.

According to illustrative embodiments of the present disclosure, a method is provided of authenticating a memory device of an IHS. In one or more embodiments, the method includes a processor accessing current memory contents of a memory device. The method includes the processor calculating a current hash value for the current memory content memory device. The method includes the processor accessing a trusted encrypted hash value and the unique key from a secure storage. The method includes the processor decrypting the trusted encrypted hash value using the unique key to obtain a trusted hash value. The method includes the processor determining whether the current hash value is identical to the trusted hash value. The method includes the processor allowing access to the current memory contents of the memory device by another processor in response to determining that the encrypted current hash value is identical to the trusted hash value.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
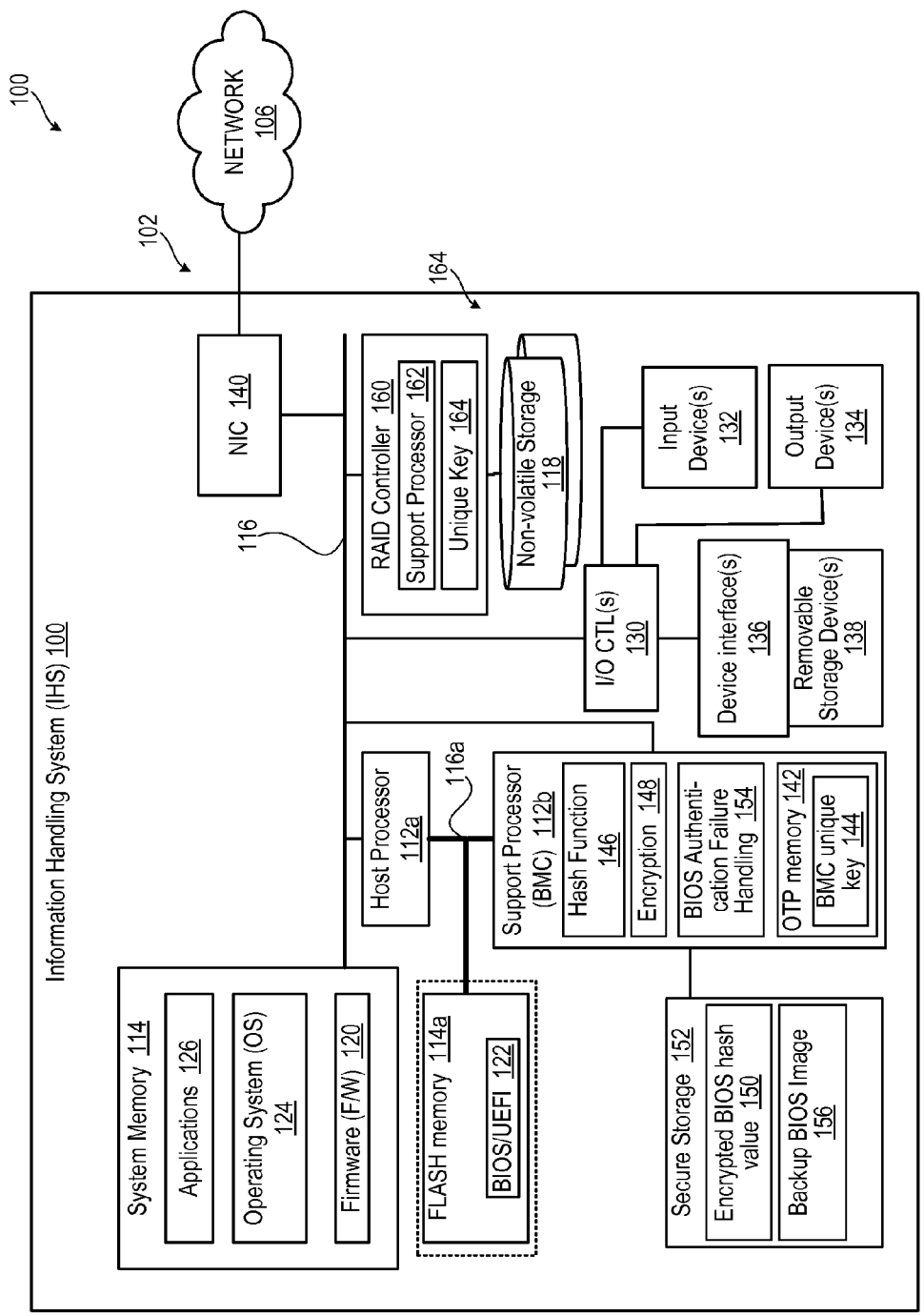
FIG. 1 illustrates a block diagram representation of an example information handling system (IHS) that having a trusted support processor that authenticates a Basic Input/Output System (BIOS), according to one or more embodiments.

The present innovation provides for authenticating a Basic Input/Output System (BIOS) and other firmware using a service processor, such as a Baseboard Management Controller (BMC) of an information handling system (IHS). This solution provides supply chain assurance for the BIOS image, the sanctity of which is critical for the overall hygiene of the IHS, and of highly increased focus within the industry. Ensuring trustworthiness of the BIOS image helps to prevent malicious firmware code from compromising the IHS. In particular, the present innovation provides a confirmation of authenticity of BIOS firmware without added cost.

In one or more embodiments, during factory flash of BIOS, BMC reads the BIOS image and calculates a unique hash using a unique key that is different for each BMC. BMC encrypts the hash using a unique key and stores the encrypted value in secure storage, such as a credential vault. The unique key is different between different BMC and is stored in One Time Programmable (OTP) memory on the BMC chip. Subsequently, when the server is turned on or rebooted, the BMC reads the BIOS image directly from the SPI flash, calculates its hash and encrypts it, and compares with the value stored in secure storage. If the hash matches the value stored in the secure storage, then the server is allowed to boot. Otherwise the BMC shuts down the server and alerts the administrator via existing alerting mechanisms like SNMP traps, email alerts, etc., and invokes BIOS recovery using backup image. In alternate embodiment, ability of BMC to write an authentic BIOS image directly to BIOS flash when current image is compromised. BIOS firmware update can be done through the BMC, in an exemplary embodiment, or directly to BIOS (or other device) in alternative embodiments.

Updates to the BIOS can be performed through BMC also with assurance to the supply chain. BMC verifies the signature of the new firmware image. BMC computes a hash of the new firmware image, encrypts the hash value, and stores the encrypted hash value in the secure storage. BMC then lets the signed BIOS flash update process occur, as designed for the platform.

The present innovation provides fool-proof authentication check of server BIOS firmware that prevents the server from booting or managing server boot when BIOS or any such targeted firmware is not authentic. The present innovation provides a method for authentication between BMC and other firmware. Trust is maintained across firmware update handling. Programmable handling is provided of authentication failure, including halt, notification, or restoring authentic firmware image. The ability of BMC is provided to read the firmware image from the device flash during run time and audit that the firmware image is still authentic. BMC is able to write an authentic BIOS image directly to BIOS flash when the current image is compromised. This algorithm can be implemented on other controllers on the motherboard. For example BMC can validate firmware on a Network Interface Card (NIC), or a RAID (Redundant Array of Inexpensive Drives) controller can check the authenticity of disks attached to it.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100 that has a trusted support processor that authenticates a BIOS before execution by a host processor. Within the general context of IHSes, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

IHS 100 includes at least one central processing unit (CPU) or host processor 112a coupled to a system memory 114 via a system interconnect 116. The host processor 112a can also be referred to as a management processor. System interconnect 116 can be interchangeably referred to as a system bus, in one or more embodiments. Also coupled to system interconnect 116 is non-volatile storage (e.g., a non-volatile random access memory (NVRAM)) 118, within which can be stored one or more software and/or firmware modules and one or more sets of data that can be utilized during operations of management IHS 100. These one or more software and/or firmware modules can be loaded into system memory 114 during operation of management IHS 100. Specifically, in one embodiment, system memory 114 can include therein a plurality of such modules, including one or more of firmware (F/W) 120, basic input/output system (BIOS) or Uniform Extensible Firmware Interface (UEFI) 122, operating system (OS) 124, and application(s) 126. These software and/or firmware modules have varying functionality when their corresponding program code is executed by CPU 112 or secondary processing devices within management IHS 100. For example, application(s) 126 may include a word processing application, a presentation application, and a management station application, among other applications.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a USB, a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses.

IHS 100 comprises a network interface controller (NIC) 140. NIC 140 enables IHS 100 and/or components within IHS 100 to communicate and/or interface with other devices, services, and components that are located external to IHS 100, such as the managed IHS 110. These devices, services, and components can interface with IHS 100 via an external network. According to one aspect of the disclosure, NIC 140 represents a communication mechanism that enables the IHS 100 to communicate with one or more clients, as described in greater detail hereinafter. Network 106 can be a local area network, wide area network, personal area network, and the like, and the connection to and/or between network and IHS 100 can be wired or wireless or a combination thereof. For purposes of discussion, network 106 is indicated as a single collective component for simplicity. However, it should be appreciated that network 106 can comprise one or more direct connections to other devices as well as a more complex set of interconnections as can exist within a wide area network, such as the Internet.

In an exemplary embodiment, the IHS 100 is readily configurable by having removable flash memory modules 114a. For example, the BIOS/UEFI 122 can stored in a particular removable flash memory module 114a that is addressable over a dedicated portion 116a of the system interconnect 116 that utilizes Serial Peripheral Interface (SPI) protocol or similar protocol. The host processor 112a is in communication with an entirety of the removable flash memory module 114a over the dedicated bus 116a in order to execute the BIOS/UEFI 122. A support processor, such as a baseboard management controller (BMC) 112b, is able to directly or indirectly access the dedicated bus 116a of the system interconnect 116 and to also authenticate an entirety of the removable flash memory module 114a to include the BIOS/UEFI 122. Some generally-known approaches to authentication of a flash memory module cannot access the entirety of the memory addresses.

Original Equipment Manufacturer (OEM) provisions an embedded, one-time-programmable (OTP) memory 142 of BMC 112b with a unique key 144. OEM also stores an original BIOS/UEFI 122 in the removable flash memory module 114a. BMC 112b executes a hash function module 146 to obtain a hash value for the BIOS/UEFI 122. BMC 112b encrypts the hash value with the unique key 144 using an encryption module 148. BMC 112b stores the encrypted BIOS hash value 150 of the BIOS/UEFI in a secure storage 152 accessible to BMC 112b. The BMC 112b can then authenticate the BIOS/UEFI 122 before a boot operation by determining another hash value for the BIOS/UEFI 122 as currently provisioned in the flash memory module 114a. In some instances, the flash memory module 114a can be readily replaceable. In other instances, the flash memory module 114a can be intended for permanent installation but replaceable in the field by removing solder joints, etc. BMC 112a encrypts the current BIOS hash value and compares the current BIOS hash value to the encrypted BIOS hash value 150. If the hash values are not identical, BIOS/UEFI 122 is not authenticated and can be deemed corrupted or compromised. BMC 112b can execute a BIOS authentication failure handling module 154 according to a policy. For example, the BIOS authentication failure handling module 154 can flash the removable flash memory module 114a with a backup BIOS image 156 that is stored in the secure storage 152, in another portion of the system memory 114, or other separate memory.

Aspects of the present innovation have application to other processors and removable storage. In one or more embodiments, IHS 100 includes a controller, such a Redundant Array of Inexpensive Drives (RAID) controller 160, for removable nonvolatile storage devices 118. RAID controller 160 has a support processor 162 on a system board 164. The support processor 162 can also include a unique key 166, which enables the RAID controller 160 to also act as a trusted agent in authenticating content in non-volatile storage 118 when starting up in a similar manner as described for BMC 112b authenticating the removable flash memory module 114a.

The present innovation provides for direct firmware updates. BIOS verifies the signature of the new firmware image. BIOS flashes the new signed BIOS payload. BIOS sends an indication to BMC (via an IPMI command or MCTP message) that firmware update is complete. BMC reads the new firmware image, computes a hash, encrypts the hash, and stores the encrypted hash in secure storage.

Intelligent Platform Management Interface (IPMI) is an open, industry-standard interface that was designed for the management of server systems over a number of different types of networks. IPMI functionality includes field-replaceable unit (FRU) inventory reporting, system monitoring, logging of system events, system recovery (including system resets and power on and power off capabilities), and alerting.

Management Component Transport Protocol (MCTP) is a protocol designed by the Distributed Management Task Force (DMTF) to support communications between different intelligent hardware components that make up a platform management subsystem, providing monitoring and control functions inside a managed computer system. This protocol is independent of the underlying physical bus properties, as well as the data link layer messaging used on the bus. The MCTP communication model includes a message format, transport description, message exchange patterns, and operational endpoint characteristics. MCTP's underlying buses include SMBus/I²C, serial links, PCI Express and USB. Simplified nature of the protocol and reduced encapsulation overheads make MCTP suitable for implementation and processing within system firmware and integrated BMCs, on a wide range of platforms, including servers, workstations and embedded devices.

In other embodiments, when BMC does not have direct access to BIOS or other device flash, BMC requests the device to transfer the whole image to BMC during boot time. BMC can then authenticate the image; however, this method is not as preferred as having direct access from BMC to device flash. Authentication failure handling can be programmable in the BMC. Actions can be programmed to send alert (e.g., Simple Network Management Protocol (SNMP) traps, email alerts, Liquid Crystal Display (LCD) message, etc.) instead of preventing the platform from booting, or to recover BIOS from a backed up copy in the BMC or alternate recovery location. Another action can be for BMC to use its embedded video controller to display a message on the screen.

The present innovation can augment other known layers of security. In one or more embodiments, Trusted Platform Module (TPM) does some authentication but this authentication is not as comprehensive as the present innovation and requires additional hardware cost and OS support. When bit locker is not set, then no real protection is provided from TPM. Even with bit locker, a hacker can spoof or replace the OS. TPM can be spoofed if new firmware knows the hash of old/authentic firmware.

Another mechanism that can provide authentication for small portion of a removable flash memory ("boot block") that contains BIOS is Intel's Boot Guard technology, which is upcoming in next generation products. The mechanism/methodology described herein provides authentication for the entire BIOS image, compared to Intel's Boot Guard that can only verify the boot block portion of BIOS flash.

Figure 2:
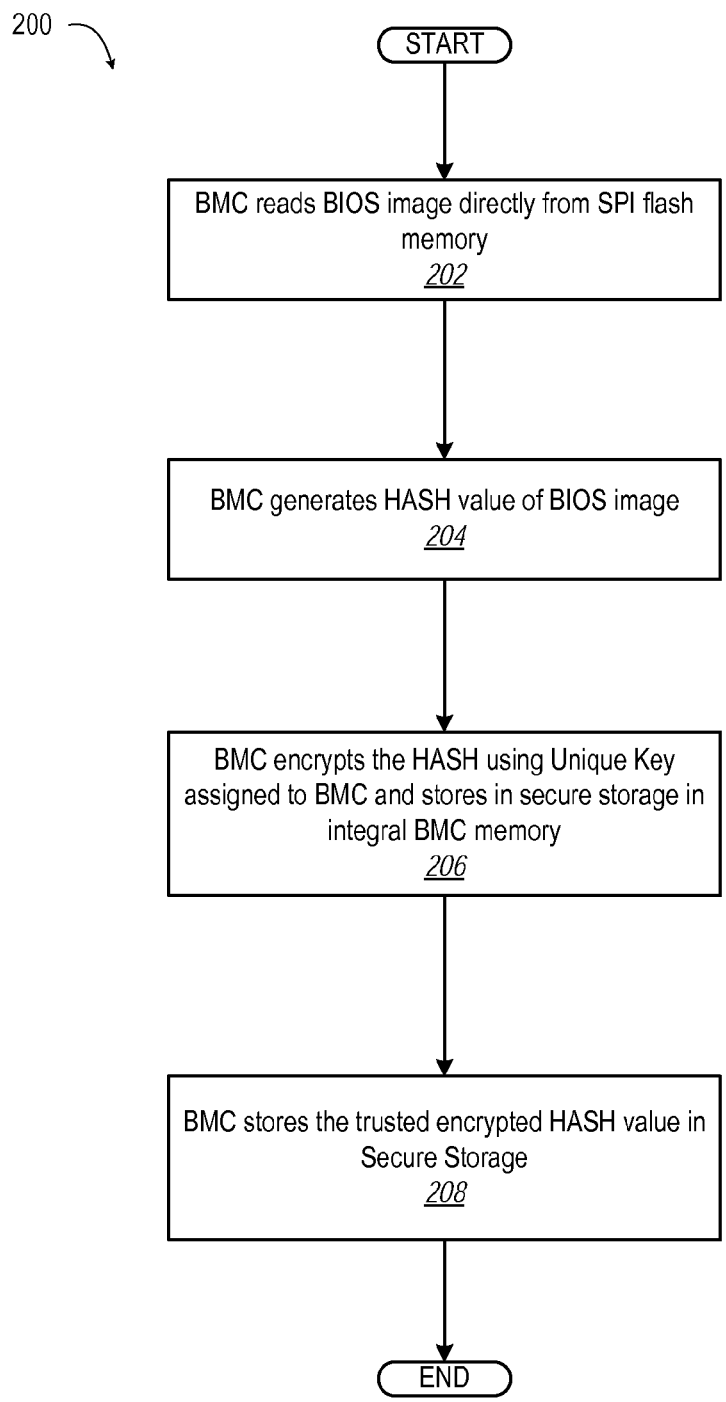
FIG. 2 illustrates a flow diagram of a method of factory provisioning a baseboard management controller (BMC) for BIOS authentication, according to one or more embodiments.
Figure 3:
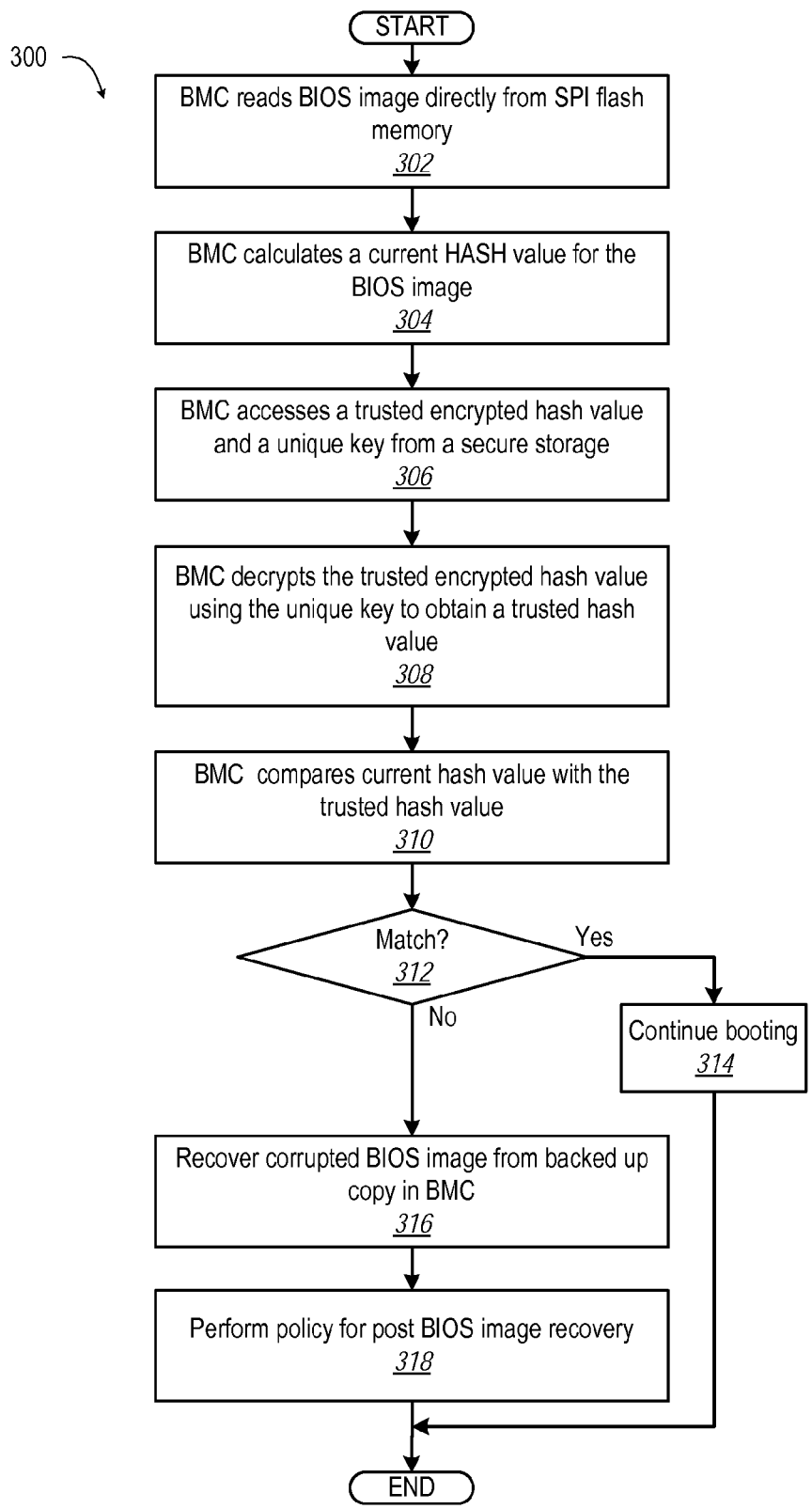
FIG. 3 illustrates a flow diagram of a method of authenticating a BIOS before a boot operation, according to one or more embodiments.
Figure 4:
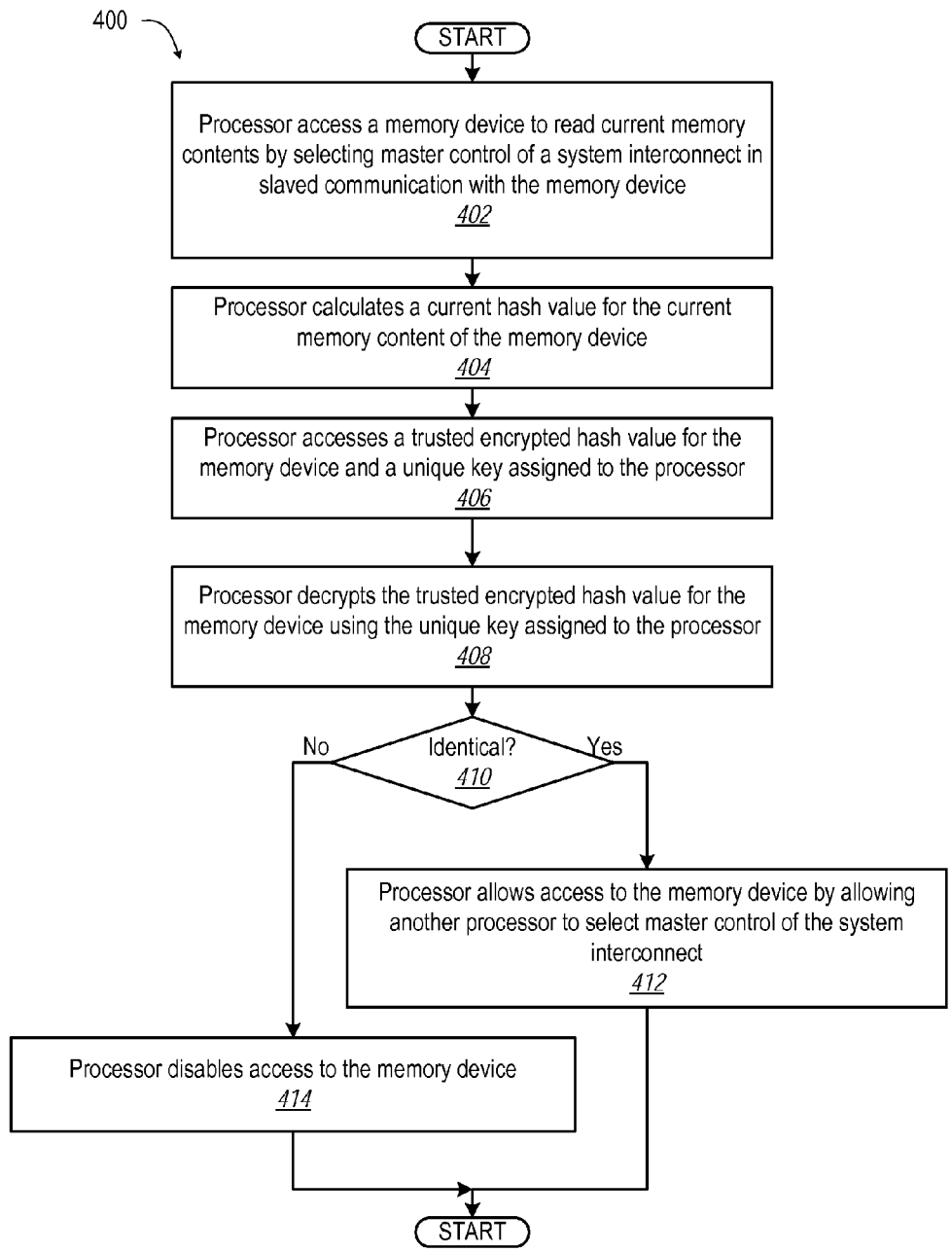
FIG. 4 illustrate a flow diagram of a method of authenticating a memory device of an IHS, according to one or more embodiments.

FIGS. 2-4 illustrate flowcharts of exemplary methods 200, 300, 400 by which BMC 112*b* (FIG. 1) performs different aspects of the processes that enable the one or more embodiments of the disclosure. Generally, methods 200, 300, 400 represent a computer-implemented method. The description of methods 200, 300, 400 is provided with general reference to the specific components illustrated within FIG. 1. Generally methods 200, 300, 400 are described as being implemented via processor 112*b* (FIG. 1) and particularly the execution of code provided by hash function module 146, encryption module 148, and authentication failure handling module 154 (FIG. 1) within BMC 112*b* in coordination with host processor 112*a* (FIG. 1). The methods 200, 300, 400 thereby provide authentication of BIOS to provide assurance to a supply chain that a malicious flash memory module has not been inserted in the IHS. It is however appreciated that certain aspects of the described methods may be implemented via other processing devices and/or execution of other code.

FIG. 2 illustrates a method 200 of factory provisioning a BMC for BIOS authentication. In one or more embodiments, method 200 includes BMC reading BIOS image directly from SPI flash memory (block 202). Method 200 includes BMC generating a trusted hash value of BIOS image (block 204). BMC encrypts the trusted hash value using a unique key assigned to BMC (block 206). BMC stores the trusted encrypted hash in secure storage in integral BMC memory (block 208). Then method 200 ends.

FIG. 3 illustrates a method 300 of authenticating a BIOS before a boot operation. In one or more embodiments, method 300 includes BMC reading BIOS image directly from SPI flash memory (block 302). BMC calculates a current hash value for the BIOS image (block 304). BMC accesses a trusted encrypted hash value and a unique key from a secure storage (block 306). BMC decrypts the trusted encrypted hash value using the unique key to obtain a trusted hash value (block 308). BMC compares current hash value with the trusted hash value (block 310). BMC determines whether there is a match between the current hash value and the trusted hash value (decision block 312). In response to the hash values matching in decision block 312, then method 300 includes continuing booting of the IHS (block 314). Then method 300 ends. In response to determining that the hash values do not match in decision block 312, then method 300 includes recovering corrupted BIOS image from a backed-up copy in BMC (block 316). BMC can perform a policy for post BIOS image recovery such as alerting an administrator (block 318). Then method 300 ends.

Aspects of the present innovation of a trusted support processor authenticating a BIOS on a flash memory module can be extended to other executable instructions on various memory devices. A flash memory module, can contain memory content that includes executable instructions. The memory content can also include data as well as executable instructions. The memory device can. be readily replaceable or capable of being introduced with some disassembly and installation work.

FIG. 4 illustrate a method 400 of authenticating a memory device of an IHS. In one or more embodiments, the method 400 includes a processor accessing current memory contents of a memory device. In a particular embodiment, the processor selects master control of a system interconnect in slaved communication with the storage device to read the current memory contents (block 402). Processor calculates a current hash value for the current memory content (block 404). Processor accesses a trusted encrypted hash value for the memory device and a unique key assigned to the processor (block 406). Processor decrypts the trusted encrypted hash value for the memory device using the unique key assigned to the processor (block 408). Processor determines whether the current hash value is identical to the trusted hash value (decision block 410). In response to determining that the current hash value is identical to the trusted hash value for the memory device in decision block 410, processor allows access to the storage device. In a particular embodiment, the processor allows another processor to select master control of the system interconnect in response to determining that the encrypted current hash value is identical to the trusted hash value for the memory device (block 412). Then method 400 ends. In response to determining that the encrypted current hash value is not identical to the trusted hash value for the memory device in decision block 410, processor disables access to the storage device. For example, the processor can shut down the IHS, alert an administrator, invoke a backup image of the memory contents, etc. (block 414). Then method 400 ends.

In one or more embodiments, the method 400 can include the processor preparing the storage device for use by: (a) calculating a hash value from memory content stored in the memory device; (b) encrypting the hash value using a unique key that is assigned to the processor to create the trusted hash value; and (c) storing the trusted hash value for the particular nonvolatile storage device in a secure storage.

In the above described flow charts of FIGS. 2-4, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) for preventing execution of corrupted boot up instructions in flash memory, the IHS comprising:
   a system interconnect;
   a memory component containing basic input/output system (BIOS) instructions to execute during boot up of the IHS;
   a host processor in communication with the memory component via the system interconnect and which executes the BIOS instructions to configure the IHS;
   a support processor in communication via the system interconnection with the memory component and comprising an embedded memory containing a unique key that is assigned to the support processor and executing instructions to configure the IHS to:
   calculate a current hash value for the BIOS instructions;
   access a trusted encrypted hash value and the unique key from a secure storage;
   decrypt the trusted encrypted hash value using the unique key to obtain a trusted hash value;
   determine whether the current hash value is identical to the trusted hash value; and
   allow execution of the BIOS instructions by the host processor in response to determining that the encrypted current hash value is identical to the trusted hash value;
   wherein the system interconnect comprises a selected one of an inter-integrated circuit ($I^2C$) bus, a Personal Computer Interconnect Express (PCIe) bus, and a Serial Peripheral Interface (SPI) bus, with selectively one of the host processor and the support processor in master communication control to read an entirety of the memory component.

2. The IHS of claim 1, wherein the support processor executes instructions to configure the IHS to replace the BIOS instructions with trusted BIOS instructions in response to determining that the current hash value is not identical to the trusted hash value.

3. The IHS of claim 1, wherein, in response to determining that the current hash value is not identical to the trusted hash value, the support processor executes instructions to configure the IHS to perform at least one of:
    shut down the IHS;
    send an alert to an administrator; and
    invoke a BIOS recovery using a backup BIOS image.

4. The IHS of claim 1, wherein the support processor executes instructions to configure the IHS during a first boot to:
    determine whether the trusted hash value is stored in the secure storage;
    in response to determining that the trusted hash value is not stored in the secure storage:
    calculate a hash value from trusted BIOS instructions stored in the removable flash memory module;
    encrypt the hash value using the unique key to create the trusted hash value; and
    store the trusted hash value in the secure storage.

5. The IHS of claim 1, wherein the support processor executes instructions to configure the IHS to:
    receive an encrypted BIOS instruction update;
    determine, via the support processor, whether a digital signature of a source of the encrypted BIOS instruction update is a trusted source; and
    enable updating of the BIOS instructions in the removable flash memory module in response to determining that the digital signature of the source of the encrypted BIOS instruction update is a trusted source.

6. The IHS of claim 1, wherein the IHS comprises a server and the support processor comprises a baseboard management controller.

7. The IHS of claim 1, further comprising a controller of an array of replacement non-volatile storage devices, the controller executing instructions to:
    calculate a current hash value for the memory content in the particular nonvolatile storage device;
    access, from a secure storage, the unique key and a trusted encrypted hash value for the particular nonvolatile storage device encrypted with the unique key assigned to the controller;
    decrypt the trusted encrypted hash value for the particular nonvolatile storage device using the unique key to obtain a trusted hash value;
    determine whether the current hash value is identical to the trusted hash value for the particular nonvolatile storage device; and
    allow access to the particular nonvolatile storage device in response to determining that the current hash value is identical to the trusted hash value for the particular nonvolatile storage device.

8. The IHS of claim 1, further comprising a controller of an array of replacement non-volatile storage devices, the controller executing instructions to:
    determine whether a trusted encrypted hash value for a particular nonvolatile storage device is stored in the secure storage;
    in response to determining that the trusted encrypted hash value for the particular nonvolatile storage device is not stored in the secure storage:
    calculate a hash value from trusted memory content stored in the particular nonvolatile storage device;
    encrypt the hash value using a unique key that is assigned to the controller to create a trusted hash value; and
    store the trusted encrypted hash value for the particular nonvolatile storage device in the secure storage.

9. A method of authenticating Basic Input/Output System (BIOS) of an information handling system (IHS) for preventing execution of corrupted boot up instructions, the method comprising:
    calculating, by a support processor, a current hash value for the BIOS instructions;
    accessing, by the support processor, a trusted encrypted hash value and the unique key from a secure storage;
    decrypting, by the support processor, the trusted encrypted hash value using the unique key to obtain a trusted hash value;
    determining, by the support processor, whether the current hash value is identical to the trusted hash value; and
    allowing execution of the BIOS instructions by the host processor in response to determining that the encrypted current hash value is identical to the trusted hash value; and
    the support processor selectively communicating over a system interconnection shared with the host processor and comprising a selected one of an inter-integrated circuit ($I^2C$) bus, a Personal Computer Interconnect Express (PCIe) bus, and a Serial Peripheral Interface (SPI) bus in master communication control to read an entirety of the memory component.

10. The method of claim 9, further comprising replacing the BIOS instructions with trusted BIOS instructions in response to determining that the current hash value is not identical to the trusted hash value.

11. The method of claim 9, wherein, in response to determining that the current hash value is not identical to the trusted hash value, the support processor performing at least one of:
    shutting down the IHS;
    sending an alert to an administrator; and
    invoking a BIOS recovery using a backup BIOS image.

12. The method of claim 9, further comprising configuring the IHS during a first boot by:
    determining whether the trusted encrypted hash value is stored in the secure storage;
    in response to determining that the trusted hash value is not stored in the secure storage:
    calculating a hash value from trusted BIOS instructions stored in the removable flash memory module;
    encrypting the hash value using the unique key to create the trusted hash value; and
    storing the trusted hash value in the secure storage.

13. The method of claim 9, further comprising:
    receiving an encrypted BIOS instruction update;
    determining whether a digital signature of a source of the encrypted BIOS instruction update is a trusted source; and
    enabling update of the BIOS instructions in the removable flash memory module in response to determining that the digital signature of the source of the encrypted BIOS instruction update is a trusted source.

14. The method of claim 9, further comprising:
    a controller:
    determining whether a trusted encrypted hash value for a particular nonvolatile storage device of an array of replacement non-volatile storage devices is stored in the secure storage;
    in response to determining that the trusted encrypted hash value for the particular nonvolatile storage device is not stored in the secure storage:
    calculating a hash value from trusted memory content stored in the particular nonvolatile storage device;

encrypting the hash value using a unique key that is assigned to the controller and stored in the secure storage to create a trusted encrypted hash value; and storing the trusted encrypted hash value for the particular nonvolatile storage device in the secure storage.

15. A method of authenticating a memory device of an information handling system (IHS), the method comprising:

accessing, by a processor, current memory contents of a memory device;

calculating, by the processor, a current hash value for the current memory content memory device;

accessing, by the processor, a trusted encrypted hash value and the unique key from a secure storage;

decrypting, by the processor, the trusted encrypted hash value using the unique key to obtain a trusted hash value;

determining, by the processor, whether the current hash value is identical to the trusted hash value; and allowing, by the processor, access to the current memory contents of the memory device by another processor in response to determining that the encrypted current hash value is identical to the trusted hash value.

16. The method of claim 15, further comprising the processor disabling access to the memory device in response to determining that the current hash value is not identical to the trusted hash value for the memory device.

17. The method of claim 15, further comprising the processor preparing the memory device for use by:

calculating a hash value from memory content stored in the memory device;

encrypting the hash value using a unique key that is assigned to the processor and stored in the secure storage to create the trusted encrypted hash value; and storing the trusted encrypted hash value for the memory device in the secure storage.

18. The method of claim 15, further comprising:

the processor selecting master control of a system interconnect in slaved communication with the storage device to read the current memory contents; and the processor allowing another processor to select master control of the system interconnect in response to determining that the current hash value is identical to the trusted hash value for the memory device.

* * * * *